(12) United States Patent
Fujii (10) Patent No.: US 11,496,627 B2
(45) Date of Patent: Nov. 8, 2022

(54) TELEPHONE APPARATUS, METHOD OF CONTROLLING TELEPHONE APPARATUS, AND PROGRAM

(71) Applicant: NEC Platforms, Ltd., Kawasaki (JP)

(72) Inventor: Atsushi Fujii, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 245 days.

(21) Appl. No.: 16/766,788

(22) PCT Filed: Dec. 13, 2019

(86) PCT No.: PCT/JP2019/048958
§ 371 (c)(1),
(2) Date: May 26, 2020

(87) PCT Pub. No.: WO2020/183833
PCT Pub. Date: Sep. 17, 2020

(65) Prior Publication Data
US 2021/0243307 A1     Aug. 5, 2021

(30) Foreign Application Priority Data
Mar. 13, 2019  (JP) .............................. JP2019-045474

(51) Int. Cl.
H04M 9/08       (2006.01)
H04M 7/12       (2006.01)
H04M 1/58       (2006.01)

(52) U.S. Cl.
CPC ............. H04M 9/082 (2013.01); H04M 1/58 (2013.01); H04M 7/1295 (2013.01)

(58) Field of Classification Search
CPC ....... H04M 9/082; H04M 7/1295; H04M 1/58
See application file for complete search history.

(56) References Cited

U.S. PATENT DOCUMENTS

| | | | |
|---|---|---|---|
| 5,138,651 A | * | 8/1992 | Sudo ................... H04M 1/6033 343/702 |
| 5,398,282 A | | 3/1995 | Forrester et al. |

(Continued)

FOREIGN PATENT DOCUMENTS

| CN | 1756268 A | 4/2006 |
|---|---|---|
| CN | 202998253 U | 6/2013 |

(Continued)

OTHER PUBLICATIONS

Extended European Search Report for EP Application No. EP19886041.3 dated May 28, 2021.

(Continued)

*Primary Examiner* — Lisa Hashem
(74) *Attorney, Agent, or Firm* — Sughrue Mion, PLLC (57) ABSTRACT

A control unit of a telephone device is configured to perform a first processing of: estimating a line echo amount based on a volume of a DTMF signal generated by a DTMF signal generation unit and a volume of the DTMF signal input from a line; calculating a howling noise threshold value based on the maximum value of the acoustic echo generated at a handset that is measured in advance and set values of a sidetone volume, a transmission volume, and a reception volume; and calculating a difference between the line echo amount and the howling noise threshold value as an adjustment requisite amount and lowering the set value of the sidetone volume by the adjustment requisite amount when the line echo amount is larger than the howling noise threshold value.

15 Claims, 4 Drawing Sheets

(56) References Cited

U.S. PATENT DOCUMENTS

| | | | |
|---|---|---|---|
| 6,185,300 B1* | 2/2001 | Romesburg | H04M 9/08 370/290 |
| 6,590,974 B1* | 7/2003 | Remes | H04M 9/08 379/388.07 |
| 6,795,547 B1* | 9/2004 | Bjarnason | H04M 1/6033 379/388.05 |
| 6,873,837 B1* | 3/2005 | Yoshioka | B60Q 1/52 381/59 |
| 7,092,513 B1 | 8/2006 | Lashley et al. | |
| 7,215,762 B2* | 5/2007 | Fang | H04M 3/28 333/32 |
| 7,738,653 B2* | 6/2010 | Fang | H04M 7/0096 379/345 |
| 8,050,398 B1 | 11/2011 | Xu | |
| 8,504,115 B2* | 8/2013 | Junge | H04M 1/58 379/100.15 |
| 8,917,885 B2* | 12/2014 | Sakurada | H04R 3/02 381/103 |
| 10,069,963 B2* | 9/2018 | Ogawa | H04M 3/28 |
| 10,178,486 B2* | 1/2019 | Yuan | H04B 1/715 |
| 10,339,953 B2* | 7/2019 | Liang | G10L 25/45 |
| 10,715,675 B2* | 7/2020 | Matsui | G10L 21/0232 |
| 10,735,869 B2* | 8/2020 | Hong | H04M 1/20 |
| 2004/0091099 A1* | 5/2004 | Akie | H04B 3/23 379/406.01 |
| 2004/0170283 A1* | 9/2004 | Terada | H04M 9/082 381/94.3 |
| 2007/0280487 A1* | 12/2007 | Ura | H04R 3/02 381/93 |
| 2014/0349638 A1 | 11/2014 | Umezawa et al. | |
| 2015/0104039 A1* | 4/2015 | Lee | G10L 21/0208 381/93 |
| 2018/0309871 A1 | 10/2018 | Shi et al. | |
| 2021/0243307 A1* | 8/2021 | Fujii | H04M 1/58 |

FOREIGN PATENT DOCUMENTS

| | | |
|---|---|---|
| CN | 106657700 A | 5/2017 |
| JP | S59-167128 A | 9/1984 |
| JP | 07-038635 A | 2/1995 |
| JP | 08-335976 A | 12/1996 |
| JP | 08-335977 A | 12/1996 |
| JP | 11-234176 A | 8/1999 |
| JP | 2000-295336 A | 10/2000 |
| JP | 2000-295344 A | 10/2000 |
| JP | 2003-046636 A | 2/2003 |
| JP | 2005-176177 A | 6/2005 |
| JP | 2014-107805 A | 6/2014 |
| JP | 6447763 B1 | 1/2019 |

OTHER PUBLICATIONS

Japanese Office Action for JP Application No. 2019-218732 dated Jan. 5, 2021 with English Translation.

Chinese Office Action for CN Application No. 201980006030.4 dated Apr. 6, 2021 with English Translation.

International Search Report for PCT/JP2019/048958 dated Jan. 14, 2020.

* cited by examiner

TELEPHONE APPARATUS, METHOD OF CONTROLLING TELEPHONE APPARATUS, AND PROGRAM

CROSS REFERENCE TO RELATED APPLICATIONS

This application is a National Stage of International Application No. PCT/JP2019/048958 filed Dec. 13, 2019, claiming priority based on Japanese Patent Application No. 2019-045474 filed Mar. 13, 2019, the disclosure of which is incorporated herein by reference in its entirety.

TECHNICAL FIELD

The present disclosure relates to a telephone apparatus, a method of controlling a telephone apparatus, and a program.

BACKGROUND ART

Patent Literature 1 discloses a technique of making a conversation over the phone more natural by determining the sum of the attenuation values of a transmission signal and a reception signal to be a proper value. Specifically, in Patent Literature 1, first, a white noise is input to a telephone line and the white noise is input as a sidetone into a reception signal path by line coupling, and then a difference between the level of detection of the white noise on the reception side and that of the transmission side is calculated. Next, based on the above difference between the levels of detection, each of an acoustic coupling amount and a line coupling amount is calculated, and based on the result of the calculation, the sum of the attenuation amounts of the transmission signal and the reception signal is set.

CITATION LIST

Patent Literature

Patent Literature 1: Japanese Unexamined Patent Application Publication No. H08-335976

SUMMARY OF INVENTION

Technical Problem

However, as disclosed in Patent Literature 1, for example, if a reception volume is set large when a line echo amount is large, a howling noise is generated when placing the telephone handset down while on line or placing the telephone handset back onto the telephone set after the end of the conversation.

Further, although there is a method of cancelling a howling noise using a line echo canceller, not only is there a possibility that the quality of conversation may be degraded due to the echo estimation, but also the cost of the telephone apparatus increases.

An object of the present disclosure is to provide a telephone apparatus that can prevent generation of a howling noise more reliably, a method of controlling a telephone apparatus, and a program.

Solution to Problem

A telephone apparatus according to a first aspect includes:
a DTMF signal generation unit configured to generate a DTMF signal based on a telephone number;
a line interface unit configured to transmit the DTMF signal to a line;
a line volume measurement unit configured to measure a volume of the DTMF signal input from the line;
a sidetone volume configured to adjust a volume of a sidetone signal;
a transmission volume configured to adjust a volume of a transmission signal;
a reception volume configured to adjust a volume of a reception signal;
a control unit configured to control the sidetone volume, the transmission volume, and the reception volume; and
a storage unit configured to store a maximum value of an acoustic echo generated at a handset and set values of the sidetone volume, the transmission volume, and the reception volume,
in which the control unit is configured to perform a first processing of:
estimating a line echo amount based on a volume of the DTMF signal generated by the DTMF signal generation unit and a volume of the DTMF signal input from the line;
calculating a howling noise threshold value based on the maximum value of the acoustic echo and the set values of the sidetone volume, the transmission volume, and the reception volume; and calculating a difference between the line echo amount and the howling noise threshold value as an adjustment requisite amount and lowering the set value of the sidetone volume by the adjustment requisite amount when the line echo amount is larger than the howling noise threshold value.

A method of controlling a telephone apparatus according to a second aspect includes performing, by a control unit of the telephone apparatus, a first processing of:
estimating a line echo amount based on a volume of a DTMF signal generated based on a telephone number and a volume of the DTMF signal input from a line;
calculating a howling noise threshold value based on a maximum value of an acoustic echo generated at a handset and set values of a volume of a sidetone signal, a volume of a transmission signal, and a volume of a reception signal; and
calculating a difference between the line echo amount and the howling noise threshold value as an adjustment requisite amount and lowering the set value of the volume of the sidetone signal by the adjustment requisite amount when the line echo amount is larger than the howling noise threshold value.

A program according to a third aspect causes a control unit of a telephone apparatus to perform a first processing of:
estimating a line echo amount based on a volume of a DTMF signal generated based on a telephone number and a volume of the DTMF signal input from a line;
calculating a howling noise threshold value based on a maximum value of an acoustic echo generated at a handset and set values of a volume of a sidetone signal, a volume of a transmission signal, and a volume of a reception signal; and
calculating a difference between the line echo amount and the howling noise threshold value as an adjustment requisite amount and lowering the set value of the volume of the sidetone signal by the adjustment requisite amount when the line echo amount is larger than the howling noise threshold value.

Advantageous Effects of Invention

According to the present disclosure, it is possible to provide a telephone apparatus that can prevent generation of a howling noise more reliably, a method of controlling the telephone apparatus, and a program.

DESCRIPTION OF EMBODIMENTS

Example Embodiments

Hereinbelow, example embodiments of the present disclosure are explained with reference to the drawings.

Figure 1:
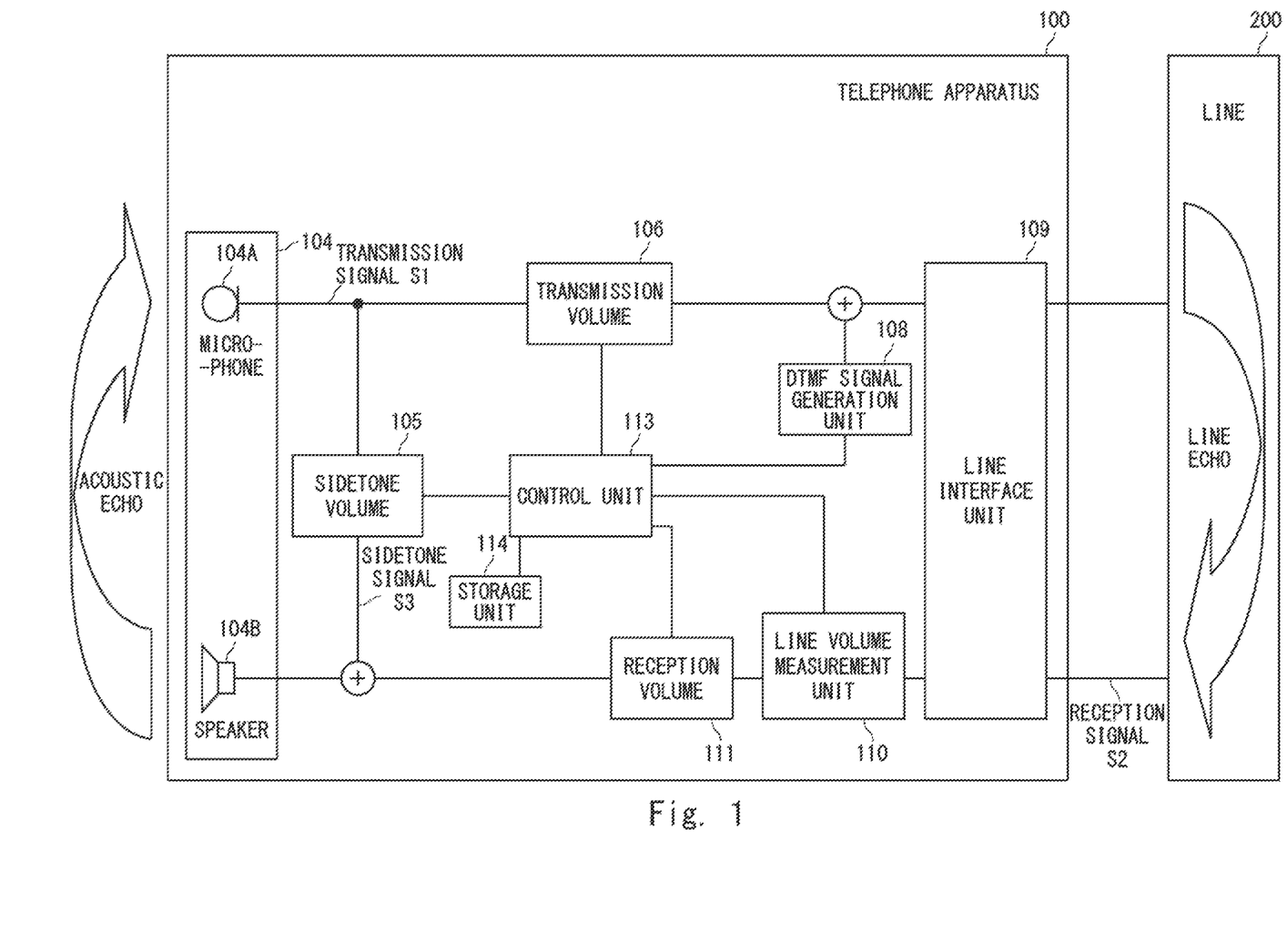
FIG. 1 is a block diagram showing an example of a telephone apparatus according to a first example embodiment.

A telephone apparatus 100 according to the first example embodiment includes, as shown in FIG. 1, at least a handset 104, a sidetone volume 105, a transmission volume 106, a DTMF (Dual Tone Multiple Frequency) signal generation unit 108, a line interface unit 109, a line volume measurement unit 110, a reception volume 111, a control unit 113, and a storage unit 114 etc. Further, as shown in FIG. 1, the telephone apparatus 100 is connected to a line 200 via a line interface unit 109.

Then, the control unit 113 estimates a line echo amount based on a volume of the DTMF signal generated by the DTMF signal generation unit 108 based on a telephone number and a volume of the DTMF signal input from the line 200.

Further, the control unit 113 calculates a howling noise threshold value based on a maximum value of an acoustic echo generated at the handset that is stored in the storage unit 114 and set values of the sidetone volume 105, the transmission volume 106, and the reception volume 111.

Further, the control unit 113 performs a first processing of calculating a difference between the line echo amount and the howling noise threshold value as an adjustment requisite amount when the line echo amount is larger than the howling noise threshold value and lowering the set value of the sidetone volume 105 by the adjustment requisite amount.

In the telephone apparatus 100 according to the first example embodiment, when the line echo amount exceeds the howling noise threshold value, namely, when the sum of the line echo amount estimated using the DTMF signal, the maximum value of the acoustic echo amount, the set value of the transmission volume 106, the set value of the reception volume 111, and the set value of the sidetone volume 105 is a positive value, the control unit 113 lowers set value of the sidetone volume 105 by the adjustment requisite amount whereby the howling noise can be prevented. Further, since the maximum value of the acoustic echo used to calculate the howling noise threshold value is the maximum value of the acoustic echo generated at the handset 104, for example, it is possible to prevent generation of the howling noise that is generated when the handset is placed down while on line. Accordingly, it is possible to provide the telephone apparatus 100 that can prevent generation of a howling noise more reliably.

First Example Embodiment

Figure 2:
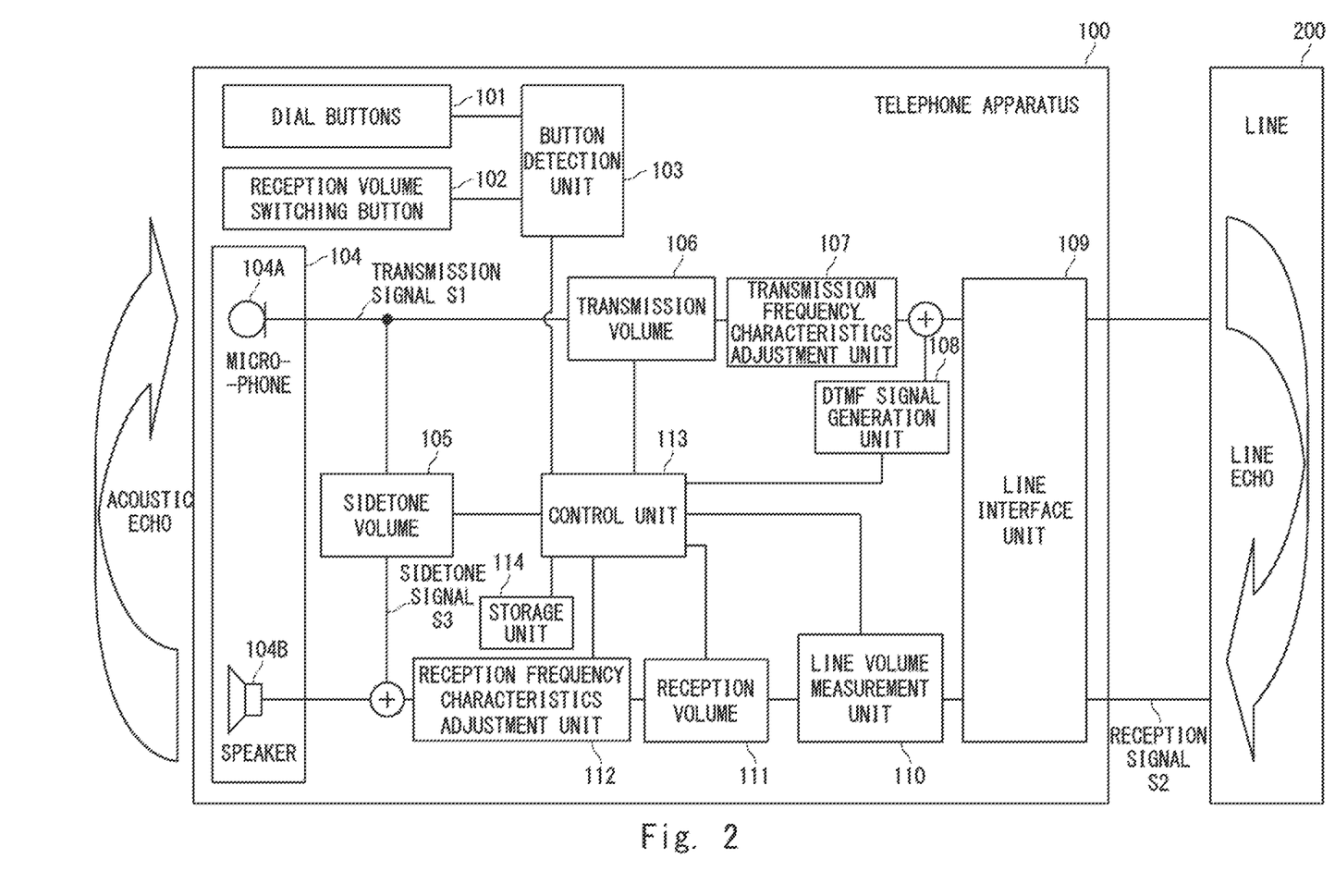
FIG. 2 is a block diagram showing an example of the telephone apparatus according to the first example embodiment.

FIG. 2 is a block diagram showing an example of the telephone apparatus 100 according to the first example embodiment. As shown in FIG. 2, the telephone apparatus 100 includes dial buttons 101, a reception volume switching button 102, a button detection unit 103, the handset 104, the sidetone volume 105, the transmission volume 106, a transmission frequency characteristics adjustment unit 107, the DTMF signal generation unit 108, the line interface unit 109, the line volume measurement unit 110, the reception volume 111, a reception frequency characteristics adjustment unit 112, the control unit 113, and the storage unit 114, etc. Further, as shown in FIG. 2, the telephone apparatus 100 is connected to the line 200 via the line interface unit 109.

The dial buttons 101 have the numbers 0 to 9 etc. and when a user presses the buttons, it is detected by the button detection unit 103.

The reception volume switching button 102 includes, for example, a volume-up button (not shown) and a volume-down button (not shown). When the volume-up button of the reception volume switching button 102 is pressed, it is detected by the button detection unit 103.

The button detection unit 103 detects that the dial buttons 101 have been pressed and inputs information related to a telephone number that has been designated by the pressing of the dial buttons 101 to the control unit 113. Further, the button detection unit 103 detects that the reception volume switching button 102 has been pressed and inputs reception volume switching information to the control unit 113.

The handset 104 is equipped with, for example, a microphone 104A, a speaker 104B etc.

The microphone 104A detects a voice of the user, converts it into an electrical signal, and inputs it as a transmission signal S1 to the sidetone volume 105 and the transmission volume 106.

The speaker 104B converts an electrical signal which is a voice of the person to whom the user is speaking into a voice and outputs it.

The sidetone volume 105 adjusts a volume of a sidetone signal S3. Specifically, the sidetone volume 105 adjusts the volume of the sidetone signal S3 in accordance with the set value input from the control unit 113.

The transmission volume 106 adjusts a volume of the transmission signal S1. Specifically, the transmission volume 106 adjusts the volume of the transmission signal in accordance with the set value input from the control unit 113.

The transmission frequency characteristics adjustment unit 107 adjusts the frequency characteristics of the transmission signal S1 which is a voice of the user. Specifically, the transmission frequency characteristics adjustment unit 107 adjusts the frequency characteristics of the transmission signal S1 in accordance with the set value input from the control unit 113.

The DTMF signal generation unit 108 generates a DTMF signal based on the information related to the telephone number input from the button detection unit 103 to the control unit 113. Specifically, the information related to the telephone number is input from the control unit 113 to the DTMF signal generation unit 108. Further, the DTMF signal generation unit 108 generates the DTMF signal based on the information related to the telephone number. Further, the DTMF signal generation unit 108 adds the generated DTMF signal to the transmission signal S1 output from the transmission frequency characteristics adjustment unit 107.

The line interface unit 109 controls connection between the telephone apparatus 100 and the line 200. Specifically, the line interface unit 109 outputs the transmission signal S1 to which the DTMF signal generated by the DTMF signal generation unit 108 is added to the line 200. Further, the line interface unit 109 inputs the reception signal S2 input from the line 200 to the line volume measurement unit 110.

The line volume measurement unit 110 measures the volume of the reception signal S2 input from the line 200 through the line interface unit 109. Here, the reception signal S2 is a signal that is obtained by converting the voice of the person to whom the user is speaking into an electrical signal. Further, the line volume measurement unit 110 according to the first example embodiment measures the volume of the DTMF signal input as the reception signal S2 by the line echo in the line 200 and inputs the value of the volume of the measured DTMF signal into the control unit 113.

The reception volume 111 adjusts the volume of the reception signal S2 input from the line 200 through the line interface unit 109 and the line volume measurement unit 110. Specifically, the reception volume 111 adjusts the volume of the reception signal in accordance with the set value input from the control unit 113.

The reception frequency characteristics adjustment unit 112 adjusts the frequency characteristics of the reception signal S2 which is a voice of the person to whom the user is speaking. Specifically, the reception frequency characteristics adjustment unit 112 adjusts the frequency characteristics of the reception signal S2 in accordance with the set value input from the control unit 113.

The control unit 113 includes a CPU (Central Processing Unit) etc. (not shown). By causing the CPU to execute a program stored in the storage unit 114, all of the processing performed by the control unit 113 is realized. Specifically, by causing the CPU to the program stored in the storage unit 114, the control unit 113 controls each unit of the telephone apparatus 100. Specifically, the control unit 113 controls the sidetone volume 105, the transmission volume 106, the transmission frequency characteristics adjustment unit 107, the DTMF signal generation unit 108, the line volume measurement unit 110, the reception volume 111, and the reception frequency characteristics adjustment unit 112. Further, the program stored in the storage unit 114 includes a code for realizing each processing performed by the control unit 113 by being executed by the CPU.

Note that the storage unit 114 is configured, for example, so as to include an arbitrary storage unit that stores the program described above or various information used in the processing performed by the control unit 113. The storage device is, for example, a memory or the like.

More specifically, the control unit 113 compares, for example, the volume of the DTMF signal which is added to the transmission signal S1 by the DTMF signal generation unit 108 with the volume of the DTMF signal which is measured by the line volume measurement unit 110 and estimates the line echo amount in the line 200.

Further, the control unit 113 reads out the maximum acoustic echo amount stored in the storage unit 114 and calculates the howling noise threshold value of the line echo amount in the line 200 where the howling noise occurs based on the maximum acoustic echo amount and the set values of the sidetone volume 105, the transmission volume 106, the transmission frequency characteristics adjustment unit 107, the reception volume 111, and the reception frequency characteristics adjustment unit 112. Here, set value of the sidetone volume 105 is a prescribed value indicating the volume of the sidetone signal S3. Further, the set value of the transmission volume 106 is a prescribed value indicating the volume of the transmission signal S1. Further, the set value of the reception volume 111 is a prescribed value indicating the volume of the transmission signal S2. Further, the set value of the transmission frequency characteristics adjustment unit 107 is a prescribed value indicating the frequency characteristics of the transmission signal S1. Further, the reception frequency characteristics adjustment unit 112 is a prescribed value indicating the frequency characteristics of the reception signal S2. Further, the frequency characteristics refers to a relationship between the frequency and the output value of the frequency. That is, the set value of the transmission frequency characteristics adjustment unit 107 refers to the prescribed output value of the prescribed frequency of the transmission signal S1. Similarly, the set value of the reception frequency characteristic adjustment unit 112 refers to the prescribed output value of the prescribed frequency of the reception signal S2.

Further, the control unit 113 compares the estimated line echo amount with the calculated howling noise threshold value. Then the control unit 113 performs the processing (1) to (3) described below.

(1) When the line echo amount is larger than the howling noise threshold value, the control unit 113 calculates the amount of difference between the line echo amount and the howling noise threshold value as the adjustment requisite amount. Further, the control unit 113 automatically lowers the set value of the sidetone volume 105 by the adjustment requisite amount (the first processing).

Accordingly, the howling noise threshold value becomes equal to or larger than the line echo amount, and thus the howling noise can be prevented. Further, even when the set value of the sidetone volume 105 is lowered, the line echo can be heard as a sidetone, and thus there is no situation where the sidetone cannot be heard.

(2) Further, in the case where the set value of the sidetone volume 105 becomes smaller than the minimum value when the adjustment requisite amount is large and the set value of the sidetone volume 105 is lowered by the adjustment requisite amount, the control unit 113 sets the set value of the sidetone volume 105 to the minimum value. At the same time, the control unit 113 controls the transmission frequency characteristics adjustment unit 107 and the reception frequency characteristics adjustment unit 112 and adjusts the frequency characteristics of the transmission signal S1 and the reception signal S2 (a second processing). Normally, the frequency characteristics of the transmission signal S1 and the reception signal S2 are set such that the volume (the output value) equal to or larger than 2 kHz is set larger than the volume (the output value) smaller than 2 kHz, while taking into account an attenuation of the volume of high frequency due to the loss of the line. Therefore, the volume (the output value) of the frequency that is set large is automatically lowered by the adjustment requisite amount, while taking into account the lowered amount of the set value of the side volume 105. Specifically, the set values of the transmission frequency characteristics adjustment unit 107 and the reception frequency characteristics adjustment unit 112 are lowered by a value obtained by subtracting the lowered amount of the set value of the sidetone volume 105 from the adjustment requisite amount. Accordingly, the howling noise threshold value becomes equal to or larger than the line echo amount, and thus the howling noise can be prevented.

(3) Further, when the adjustment requisite amount is larger such that the adjustment amounts of the transmission frequency characteristics adjustment unit 107 and the reception frequency characteristics adjustment unit 112 exceed a prescribed adjustable range, the control unit 113 automatically lowers the set values of the transmission volume 106 and the reception volume 111 by the adjustment requisite amount (a third processing). Accordingly, the howling noise threshold value becomes equal to or larger than the line echo amount, and thus the howling noise can be prevented.

Further, when the volume-up button (not shown) of the reception volume switching button 102 is pressed while talking, the button detection unit 103 inputs the reception volume switching information indicating that the volume is to be raised to the control unit 113. Then, the control unit 113 compares the estimated line echo amount with the calculated howling noise threshold value and performs the aforementioned processing (1), (2), and (3) in this order. Accordingly, the howling noise can be prevented.

Further, when the volume-down button (not shown) of the reception volume switching button 102 is pressed while talking after the aforementioned processing (1) to (3) performed, the button detection unit 103 inputs the reception volume switching information indicating that the volume is to be lowered to the control unit 113. Then, the control unit 113 restores the set values (the frequency characteristics) of the transmission frequency characteristics adjustment unit 107 and the reception frequency characteristics adjustment unit 112 to the initial values after restoring the set values of the transmission volume 106 and the reception volume 111 to the initial values and then restores the set value of the sidetone volume 105 to the initial value.

The storage unit 114 stores the maximum value of the acoustic echo between the microphone 104A and the speaker 104B of the telephone apparatus 100 and the set values of the sidetone volume 105, the transmission volume 106, and the reception volume 111. The control unit 113 controls the microphone 104A and measures the acoustic echo amount of the state under which the acoustic echo amount becomes the largest such as when the handset is placed down while on line etc., and stores the acoustic echo amount as the maximum echo amount in the storage unit 114.

Figure 3:
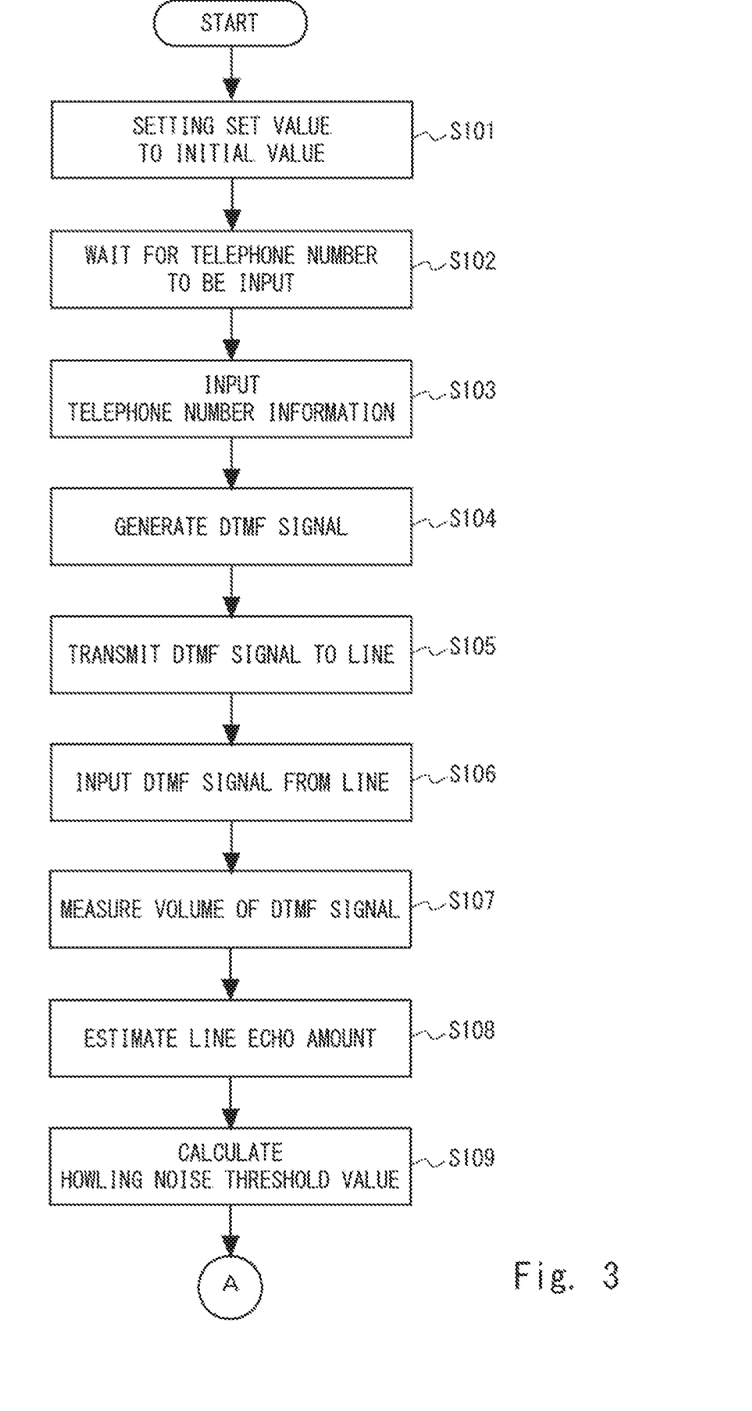
FIG. 3 is a flowchart showing an example of the telephone apparatus according to the first example embodiment.
Figure 4:
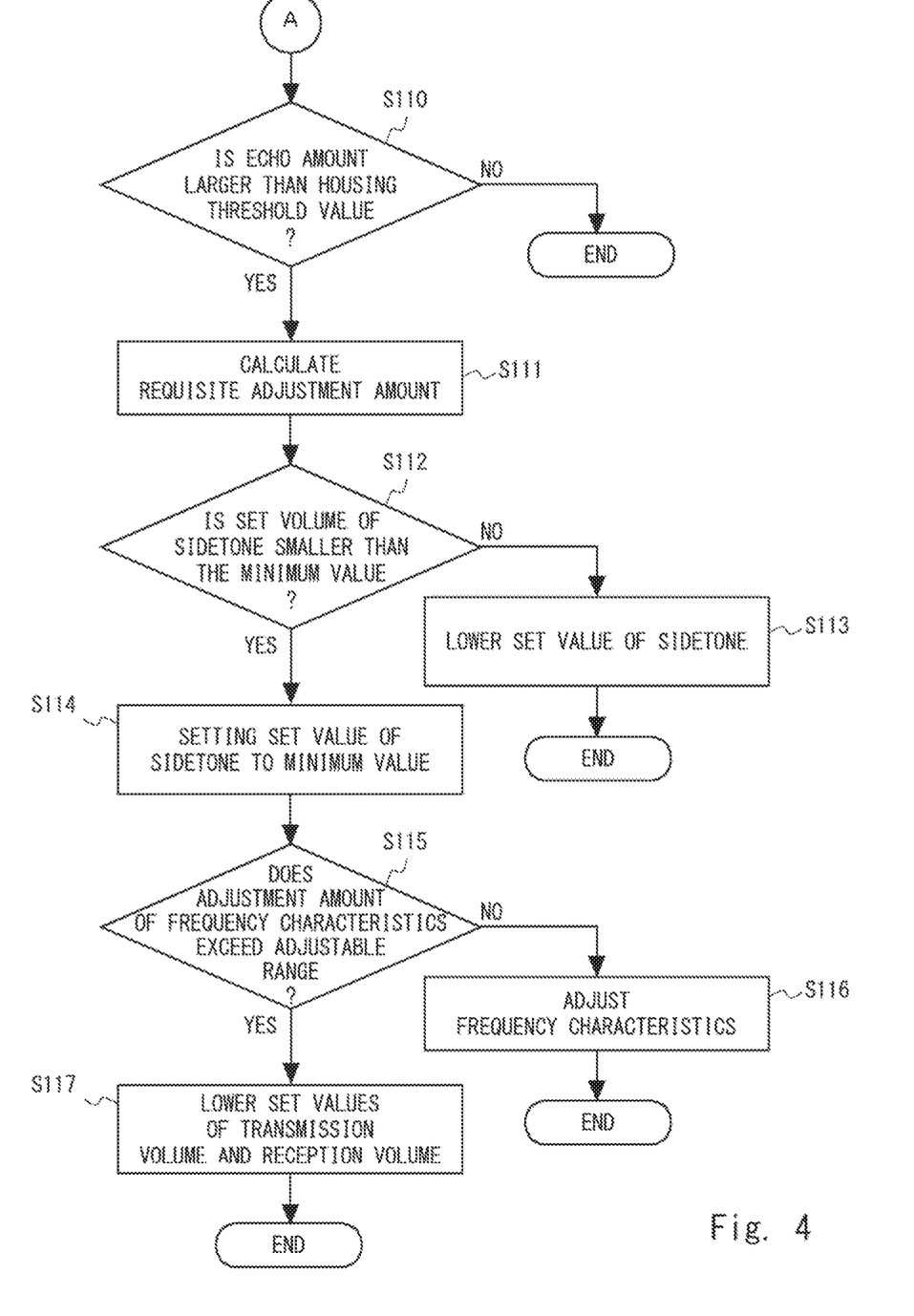
FIG. 4 is a flowchart showing an example of the telephone apparatus according to the first example embodiment.

Next, the method controlling the telephone apparatus according to the first example embodiment is explained with reference to FIGS. 3 and 4.

First, when the telephone apparatus 100 is activated, the control unit 113 sets the set values of the sidetone volume 105, the transmission volume 106, the transmission frequency characteristics adjustment unit 107, the reception volume 111, and the reception frequency characteristics adjustment unit 112 to the prescribed initial values (Step S101).

Next, when the user takes the handset 104 off the hook, the telephone apparatus 100 is connected to the line 200 to be in a state of waiting for a telephone number to be input (Step S102).

Next, when the user inputs a telephone number by pressing the dial buttons 101, the button detection unit 103 detects that the dial buttons 101 have been pressed and inputs the information related to the telephone number to the control unit 113 (Step S103).

Next, the control unit 113 inputs the information related to the telephone number to the DTMF signal generation unit 108 and the DTMF signal generation unit 108 generates the DTMF signal based on the information related to the telephone number and adds the generated DTMF signal to the transmission signal S1 (Step S104).

Next, the line interface unit 109 transmits the transmission signal S1 to which the DTMF signal is added to the line 200 (Step S105). Further, the line interface unit 109 inputs the reception signal S2 input from the line 200 to the line volume measurement unit 110 (Step S106). Here, the DTMF signal transmitted from the line interface unit 109 is input to the telephone apparatus 100 as the reception signal S2 due to the line echo in the line 200.

Next, the line volume measurement unit 110 measures the volume of the DTMF signal input as the reception signal S2 and inputs the volume of the measured DTMF signal to the control unit 113 (Step S107).

Next, the control unit 113 compares the volume of the DTMF signal which is added to the transmission signal S1 by the DTMF signal generation unit 108 with the volume of the DTMF signal which is measured by the line volume measurement unit 110 and estimates the line echo amount in the line 200 (Step S108).

Next, the control unit 113 calculates a howling noise threshold value based on a maximum acoustic echo amount stored in the storage unit 114 and the set values of the sidetone volume 105, the transmission volume 106, the transmission frequency characteristics adjustment unit 107, the reception volume 111, and the reception frequency characteristics adjustment unit 112 (Step S109).

Next, the control unit 113 determines whether or not the estimated line echo amount is larger than the calculated howling noise threshold value (Step S110).

In Step S110, when the estimated line echo amount is equal to or lower than the calculated howling noise threshold value (Step S110; No), this processing ends.

In Step S110, when the estimated line echo amount exceeds the calculated howling noise threshold value (Step S110; Yes), the control unit 113 calculates the amount of difference between the line echo amount and the howling noise threshold value as the adjustment requisite amount (Step S111).

Next, the control unit 113 determines whether not the set value of the sidetone volume 105 becomes smaller the prescribed minimum value when the set value of the sidetone volume 105 is lowered by the adjustment requisite amount calculated in Step S110 (Step S112).

In Step S112, when the set value of the sidetone volume 105 is equal to or larger than the prescribed minimum value even when the set value of the sidetone volume 105 is lowered by the adjustment requisite amount (Step S112; No), the control unit 113 automatically lowers the set value of the sidetone volume 105 by the adjustment requisite amount (Step S113), and this processing ends.

In Step S112, in the case where the set value of the sidetone volume 105 becomes smaller than the prescribed minimum value when the set value of the sidetone volume 105 is lowered by the adjustment requisite amount (Step S112; Yes), the control unit 113 sets the set value of the sidetone volume 105 to the minimum value (Step S114).

Next, the control unit 113 adjusts the frequency characteristics of the transmission frequency characteristics adjustment unit 107 and the reception frequency characteristics adjustment unit 112 as the set value of the sidetone volume 105 is set to the minimum value and determines whether or not the adjustment amount exceeds the prescribed adjustable range (Step S115).

In Step S115, when the adjustment amounts of the frequency characteristics of the transmission frequency characteristics adjustment unit 107 and the reception frequency characteristics adjustment unit 112 are within the prescribed adjustable range (Step S115; No), the control unit 113 adjusts the frequency characteristics of the transmission frequency characteristics unit 107 and the reception frequency characteristics adjustment unit 112 as the set value of the sidetone volume 105 is set to the minimum value (Step S116), and this processing ends.

In Step S115, when the adjustment amounts of the frequency characteristics of the transmission frequency characteristics adjustment unit 107 and the reception frequency characteristics adjustment unit 112 exceed the prescribed adjustable range (Step S115; Yes), the control unit 113 automatically lowers the set values of the transmission volume 106 and the reception volume 111 by the adjustment requisite amount (Step S117), and this processing ends.

Note that when the volume-up button (not shown) of the reception volume switching button 102 is pressed while talking, the control unit 113 may perform the processing of aforementioned Steps S110 to S117.

Further, when the volume-down button (not shown) of the reception volume switching button 102 is pressed while talking after performing the processing of the aforementioned steps S110 to S117, first, the control unit 113 restores the set values of the transmission volume 106 and the reception volume 111 to the initial values. Next, the control unit 113 restores the set values (the frequency characteristics) of the transmission frequency characteristics adjustment unit 107 and the reception frequency characteristics adjustment unit 112 to the initial values. Next, the control unit 113 restores the set value of the sidetone volume 105 to the initial value.

According to the telephone apparatus 100, the method of controlling the telephone apparatus 100, and the program according to the first example embodiment described above, when the line echo amount is larger than the howling noise threshold value, that is, when the sum of the line echo amount estimated using the DTMF signal, the maximum value of the acoustic echo amount, the set value of the transmission volume 106, the set value of the reception volume 111, and the set value of the sidetone volume 105 are a positive value, the control unit 113 lowers the set value of the sidetone volume 105 by the adjustment requisite amount (the first processing). Accordingly, the howling noise can be prevented. Further, the since the maximum value of the acoustic echo used for calculation of the howling noise threshold value is the maximum value of the acoustic echo generated in the handset 104, it is possible to prevent, for example, the howling noise that is generated when the handset 104 is placed down while on line etc. Accordingly, it is possible to provide the telephone apparatus 100 that can prevent generation of a howling noise more reliably, a method of controlling the telephone apparatus, and a program.

Further, in the case where the set value of the sidetone volume 105 becomes smaller than the minimum value when the adjustment requisite amount is large and the set value of the sidetone volume 105 is lowered by the adjustment requisite amount, the control unit 113 sets the set value of the sidetone volume 105 to the minimum value.

At the same time, the control unit 113 controls the transmission frequency characteristics adjustment unit 107 and the reception frequency characteristics adjustment unit 112 and adjusts the frequency characteristics of the transmission signal S1 and the reception signal S2 (the second processing). In other words, the control unit 113 lowers the frequency characteristics of the set value by the adjustment requisite amount, while taking into account the lowered amount of the set value of the sidetone volume 105. Specifically, the set values of the transmission frequency characteristics adjustment unit 107 and the reception frequency characteristics adjustment unit 112 are lowered by a value obtained by subtracting the lowered amount of the set value of the sidetone volume 105 from the adjustment requisite amount. Accordingly, the howling noise threshold value becomes equal to or larger than the line echo amount, and thus the howling noise can be prevented more reliably.

Further, when the adjustment requisite amount is even larger and the adjustment amounts of the transmission frequency characteristics adjustment unit 107 and the reception frequency characteristics adjustment unit 112 exceed the prescribed adjustable range, the control unit 113 automatically lowers the set values of the transmission volume 106 and the reception volume 111 by the adjustment requisite amount (the third processing). Accordingly, the howling noise threshold value becomes equal to or larger than the line echo amount, and thus the howling noise can be prevented even more reliably.

Further, since the control unit 113 performs the aforementioned processing even when the volume-up button (not shown) of the reception volume switching button 102 is pressed while talking, it is also possible to prevent the howling noise even if the volume of the reception signal S2 is raised.

Further, when the volume-down button (not shown) of the reception volume switching button 102 is pressed while talking after the aforementioned first to third processing are performed, the control unit 113 restores the set values (the frequency characteristics) of the transmission frequency characteristics adjustment unit 107 and the reception frequency characteristics adjustment unit 112 to the initial values after restoring the set values of the transmission volume 106 and the reception volume 111 to the initial values and then restores the set value of the sidetone volume 105 to the initial value. By this configuration, it is possible to avoid the set values of the sidetone volume 105, the transmission volume 106, and the reception volume 111 or the set values (the frequency characteristics) of the transmission frequency characteristics adjustment unit 107 and the reception frequency characteristics adjustment unit 112 from being kept lowered unnecessarily.

Note that the present disclosure is not limited to the aforementioned example embodiments and can be modified as appropriate without departing from the gist of the disclosure. For example, Steps S107 to S109 may be performed simultaneously.

Further, in the example embodiments described above, the present disclosure has been explained as a hardware configuration, however present disclosure is not limited thereto. The present disclosure can also be realized by executing the procedure shown in the flowcharts of FIGS. 3 and 4 by causing the CPU (Central Processing Unit) to execute a computer program. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the example embodiments disclosed above can be described as, but not limited to, the following supplementary notes.

(Supplementary Note 1)
A telephone apparatus
comprising:
a DTMF signal generation unit configured to generate a DTMF signal based on a telephone number;
a line interface unit configured to transmit the DTMF signal to a line;
a line volume measurement unit configured to measure a volume of the DTMF signal input from the line;
a sidetone volume configured to adjust a volume of a sidetone signal;
a transmission volume configured to adjust a volume of a transmission signal;
a reception volume configured to adjust a volume of a reception signal;
a control unit configured to control the sidetone volume, the transmission volume, and the reception volume; and
a storage unit configured to store
a maximum value of an acoustic echo generated at a handset and
set values of the sidetone volume, the transmission volume, and the reception volume,
wherein
the control unit is configured to perform a first processing of:
estimating a line echo amount based on
a volume of the DTMF signal generated by the DTMF signal generation unit and
a volume of the DTMF signal input from the line;
calculating a howling noise threshold value based on
the maximum value of the acoustic echo and
the set values of the sidetone volume, the transmission volume, and the reception volume; and
calculating a difference between the line echo amount and the howling noise threshold value as an adjustment requisite amount and
lowering the set value of the sidetone volume by the adjustment requisite amount
when the line echo amount is larger than the howling noise threshold value.

(Supplementary Note 2)
The telephone apparatus described in Supplementary note 1, further comprising:
a transmission frequency characteristics adjustment unit configured to adjust frequency characteristics of the transmission signal; and
a reception frequency characteristics adjustment unit configured to adjust frequency characteristics of the reception signal,
wherein
the storage unit is configured to store
a set value of the transmission frequency characteristics adjustment unit and
a set value of the reception frequency characteristics adjustment unit, and
the control unit is configured to perform a second processing of:
calculating the howling noise threshold value based on
the maximum value of the acoustic echo,
the set values of the sidetone volume, the transmission volume, and the reception volume, and
the set values of the transmission frequency characteristics adjustment unit and the reception frequency characteristics adjustment unit; and setting the set value of the sidetone volume to the minimum value and
lowering the set values of the transmission frequency characteristics adjustment unit and the reception frequency characteristics adjustment unit by the adjustment requisite amount,
while taking into account the lowered amount of the set value of the sidetone volume,
in the case where the set value of the sidetone volume becomes smaller than a prescribed minimum value
when the set value of the sidetone volume is lowered by the adjustment requisite amount.

(Supplementary Note 3)
The telephone apparatus described in Supplementary note 2, wherein
the control unit is configured to perform a third processing of
lowering the set values of the transmission volume and the reception volume by the adjustment requisite amount
in the case where
the adjustment amounts of the frequency characteristics of the transmission frequency characteristics adjustment unit and the reception frequency characteristics adjustment unit exceed an adjustable range,
when the set values of the transmission frequency characteristics adjustment unit and the reception frequency characteristics adjustment unit are lowered by the adjustment requisite amount,
while taking into account the lowered amount of the set value of the sidetone volume.

(Supplementary Note 4)
The telephone apparatus described in Supplementary note 3, further comprising
an operation unit configured to input a signal indicating that a volume of the reception signal is to be adjusted to the telephone apparatus,
wherein
the control unit performs
the first processing, the second processing and the third processing in this order
when a signal indicating that a volume of the reception signal is to be raised is input from the operation unit while talking.

(Supplementary Note 5)
The telephone apparatus described in Supplementary note 4, wherein
when a signal indicating that the volume of the reception signal is to be lowered is input from the operation unit while talking
after the first processing, the second processing, and the third processing are performed in this order,
the control unit
restores the set values of the transmission frequency characteristics adjustment unit and the reception frequency characteristics adjustment unit to prescribed initial values
after restoring the set values of the transmission volume and the reception volume to prescribed initial values, and then
restores the set value of the sidetone volume to a prescribed initial value.

(Supplementary Note 6)

A method of controlling a telephone apparatus comprising performing, by a control unit of the telephone apparatus, a first processing of:
estimating a line echo amount based on
a volume of a DTMF signal generated based on a telephone number and
a volume of the DTMF signal input from a line;
calculating a howling noise threshold value based on
a maximum value of an acoustic echo generated at a handset and
set values of a volume of a sidetone signal, a volume of a transmission signal, and a volume of a reception signal; and
calculating a difference between the line echo amount and the howling noise threshold value as an adjustment requisite amount and
lowering the set value of the volume of the sidetone signal by the adjustment requisite amount
when the line echo amount is larger than the howling noise threshold value.

(Supplementary Note 7)

The method of controlling the telephone apparatus described in Supplementary note 6,
further comprising
performing, by the control unit, a second processing of:
calculating the howling noise threshold value based on
the maximum value of the acoustic echo,
the set values of the volume of the sidetone signal, the volume of the transmission signal, and the volume of the reception signal, and
the set values of the frequency characteristics of the transmission signal and the frequency characteristics of the reception signal; and
setting the set value of the volume of the sidetone signal to the minimum value and
lowering the set values of the frequency characteristics of the transmission signal and the frequency characteristics of the reception signal by the adjustment requisite amount,
while taking into account the lowered amount of the set value of the volume of the sidetone signal,
in the case where the set value of the volume of the sidetone signal becomes smaller than a prescribed minimum value
when the set value of the volume of the sidetone signal is lowered by the adjustment requisite amount.

(Supplementary Note 8)

The method of controlling the telephone apparatus described in Supplementary note 7,
further comprising
performing, by the control unit, a third processing of:
lowering the set values of the volume of the transmission signal and the volume of the reception signal by the adjustment requisite amount
in the case where
the adjustment amounts of the frequency characteristics of the transmission signal and the frequency characteristics of the reception signal exceed an adjustable range,
when the set values of the frequency characteristics of the transmission signal and the frequency characteristics of the reception signal are lowered by the adjustment requisite amount,
while taking into account the lowered amount of the set values of the volume of the sidetone signal.

(Supplementary Note 9)

The method of controlling the telephone apparatus described in Supplementary note 8,
wherein
performing, by the control unit,
the first processing, the second processing, and the third processing in this order
when a signal indicating that a volume of the reception signal is to be raised is input while talking.

(Supplementary Note 10)

The method of controlling the telephone apparatus described in Supplementary note 9,
wherein
when a signal indicating that the volume of the reception signal is to be lowered is input while talking after the first processing, the second processing, and the third processing are performed in this order,
by the control unit,
restoring the set values of the frequency characteristics of the transmission signal and the frequency characteristics of the reception signal to prescribed initial values
after restoring the set values of the volume of the transmission signal and the volume of the reception signal to prescribed initial values, and then
restoring the set value of the volume of the sidetone to a prescribed initial value.

(Supplementary Note 11)

A program for a causing
a control unit of a telephone apparatus to perform a first processing of:
estimating a line echo amount based on
a volume of a DTMF signal generated based on a telephone number and
a volume of the DTMF signal input from a line;
calculating a howling noise threshold value based on
a maximum value of an acoustic echo generated at a handset and
set values of a volume of a sidetone signal, a volume of a transmission signal, and a volume of a reception signal; and
calculating a difference between the line echo amount and the howling noise threshold value as an adjustment requisite amount and
lowering the set value of the volume of the sidetone signal by the adjustment requisite amount
when the line echo amount is larger than the howling noise threshold value.

(Supplementary Note 12)

The program described in Supplementary note 11 for causing
the control unit to perform a second processing of:
calculating the howling noise threshold value based on
the maximum value of the acoustic echo,
the set values of the volume of the sidetone signal, the volume of the transmission signal, and the volume of the reception signal, and
the set values of the frequency characteristics of the transmission signal and the frequency characteristics of the reception signal; and
setting the set value of the volume of the sidetone signal to the minimum value and
lowering the set values of the frequency characteristics of the transmission signal and the frequency characteristics of the reception signal by the adjustment requisite amount,
while taking into account the lowered amount of the set value of the volume of the sidetone signal, in the case where the set value of the volume of the sidetone signal becomes smaller than a prescribed minimum value when the set value of the volume of the sidetone signal is lowered by the adjustment requisite amount.

(Supplementary Note 13)

The program described in Supplementary note 12 for causing the control unit to perform a third processing of lowering the set values of the volume of the transmission signal and the volume of the reception signal by the adjustment requisite amount in the case where the adjustment amounts of the frequency characteristics of the transmission signal and the frequency characteristics of the reception signal exceed an adjustable range, when the set values of the frequency characteristics of the transmission signal and the frequency characteristics of the reception signal are lowered by the adjustment requisite amount, while taking into account the lowered amount of the set value of the volume of the sidetone signal.

(Supplementary Note 14)

The program described in Supplementary note 13 for causing the control unit to perform the first processing, the second processing, and the third processing in this order when a signal indicating that a volume of the reception signal is to be raised is input while talking.

(Supplementary Note 15)

The program described in Supplementary note 14 for causing, when a signal indicating that the volume of the reception signal is to be lowered is input while talking after the first processing, the second processing, and the third processing are performed in this order, the control unit to restore the set values of the frequency characteristics of the transmission signal and the frequency characteristics of the reception signal to prescribed initial values after restoring the set values of the volume of the transmission signal and the volume of the reception signal to prescribed initial values, and then restore the set value of the volume of the sidetone signal a prescribed initial value.

While the disclosure has been particularly shown and described with reference to example embodiments thereof, the disclosure is not limited to these example embodiments. It will be understood by those of ordinary skill in the art that various changes in form and details may be made therein without departing from the scope of the present disclosure.

INDUSTRIAL APPLICABILITY

According to the present disclosure, it is possible to provide a telephone apparatus that can prevent generation of a howling noise more reliably, a method of controlling the telephone apparatus, and a program.

REFERENCE SIGNS LIST

100 TELEPHONE APPARATU
101 DIAL BUTTONS
102 RECEPTION VOLUME SWITCHING BUTTON
103 BUTTON DETECTION UNIT
104 HANDSET
104A MICROPHONE
104B SPEAKER
105 SIDETONE VOLUME
106 TRANSMISSION VOLUME
107 TRANSMISSION FREQUENCY CHARACTERISTICS ADJUSTMENT UNIT
108 DTMF SIGNAL GENERATION UNIT
109 LINE INTERFACE UNIT
110 LINE VOLUME MEASUREMENT UNIT
111 RECEPTION VOLUME
112 RECEPTION FREQUENCY CHARACTERISTICS ADJUSTMENT UNIT
113 CONTROL UNIT
114 STORAGE UNIT
200 LINE
S1 TRANSMISSION SIGNAL
S2 RECEPTION SIGNAL
S3 SIDETONE SIGNAL

The invention claimed is:

1. A telephone apparatus comprising:
a DTMF signal generation unit configured to generate a DTMF signal based on a telephone number;
a line interface unit configured to transmit the DTMF signal to a line;
a line volume measurement unit configured to measure a volume of the DTMF signal input from the line;
a sidetone volume configured to adjust a volume of a sidetone signal;
a transmission volume configured to adjust a volume of a transmission signal;
a reception volume configured to adjust a volume of a reception signal;
a control unit configured to control the sidetone volume, the transmission volume, and the reception volume; and
a storage unit configured to store
a maximum value of an acoustic echo generated at a handset and
set values of the sidetone volume, the transmission volume, and the reception volume,
wherein
the control unit is configured to perform a first processing of:
estimating a line echo amount based on
a volume of the DTMF signal generated by the DTMF signal generation unit and
a volume of the DTMF signal input from the line;
calculating a howling noise threshold value based on
the maximum value of the acoustic echo and
the set values of the sidetone volume, the transmission volume, and the reception volume; and
calculating a difference between the line echo amount and the howling noise threshold value as an adjustment requisite amount and
lowering the set value of the sidetone volume by the adjustment requisite amount
when the line echo amount is larger than the howling noise threshold value.

2. The telephone apparatus according to claim 1, further comprising:
a transmission frequency characteristics adjustment unit configured to adjust frequency characteristics of the transmission signal; and
a reception frequency characteristics adjustment unit configured to adjust frequency characteristics of the reception signal, wherein
the storage unit is configured to store
a set value of the transmission frequency characteristics adjustment unit and
a set value of the reception frequency characteristics adjustment unit, and
the control unit is configured to perform a second processing of:
calculating the howling noise threshold value based on
the maximum value of the acoustic echo,
the set values of the sidetone volume, the transmission volume, and the reception volume, and
the set values of the transmission frequency characteristics adjustment unit and the reception frequency characteristics adjustment unit; and
setting the set value of the sidetone volume to a minimum value and
lowering the set values of the transmission frequency characteristics adjustment unit and the reception frequency characteristics adjustment unit by the adjustment requisite amount,
while taking into account the lowered amount of the set value of the sidetone volume,
in the case where the set value of the sidetone volume becomes smaller than a prescribed minimum value
when the set value of the sidetone volume is lowered by the adjustment requisite amount.

3. The telephone apparatus according to claim 2,
wherein
the control unit is configured to perform a third processing of
lowering the set values of the transmission volume and the reception volume by the adjustment requisite amount
in the case where
the adjustment amounts of the frequency characteristics of the transmission frequency characteristics adjustment unit and the reception frequency characteristics adjustment unit exceed an adjustable range,
when the set values of the transmission frequency characteristics adjustment unit and the reception frequency characteristics adjustment unit are lowered by the adjustment requisite amount,
while taking into account the lowered amount of the set value of the sidetone volume.

4. The telephone apparatus according to claim 3,
further comprising
an operation unit configured to input a signal indicating that a volume of the reception signal is to be adjusted to the telephone apparatus,
wherein
the control unit performs
the first processing, the second processing and the third processing in this order
when a signal indicating that a volume of the reception signal is to be raised is input from the operation unit while talking.

5. The telephone apparatus according to claim 4,
wherein
when a signal indicating that the volume of the reception signal is to be lowered is input from the operation unit while talking
after the first processing, the second processing, and the third processing are performed in this order, the control unit
restores the set values of the transmission frequency characteristics adjustment unit and the reception frequency characteristics adjustment unit to prescribed initial values
after restoring the set values of the transmission volume and the reception volume to prescribed initial values, and then
restores the set value of the sidetone volume to a prescribed initial value.

6. A method of controlling a telephone apparatus comprising performing, by a control unit of the telephone apparatus, a first processing of:
estimating a line echo amount based on
a volume of a DTMF signal generated based on a telephone number and
a volume of the DTMF signal input from a line;
calculating a howling noise threshold value based on
a maximum value of an acoustic echo generated at a handset and
set values of a volume of a sidetone signal, a volume of a transmission signal, and a volume of a reception signal; and
calculating a difference between the line echo amount and the howling noise threshold value as an adjustment requisite amount and
lowering the set value of the volume of the sidetone signal by the adjustment requisite amount
when the line echo amount is larger than the howling noise threshold value.

7. The method of controlling the telephone apparatus according to claim 6,
further comprising
performing, by the control unit, a second processing of:
calculating the howling noise threshold value based on
the maximum value of the acoustic echo,
the set values of the volume of the sidetone signal, the volume of
the transmission signal, and the volume of the reception signal, and
the set values of the frequency characteristics of the transmission signal and the frequency characteristics of the reception signal; and
setting the set value of the volume of the sidetone signal to a minimum value and
lowering the set values of the frequency characteristics of the transmission signal and the frequency characteristics of the reception signal by the adjustment requisite amount,
while taking into account the lowered amount of the set value of the volume of the sidetone signal,
in the case where the set value of the volume of the sidetone signal becomes smaller than a prescribed minimum value
when the set value of the volume of the sidetone signal is lowered by the adjustment requisite amount.

8. The method of controlling the telephone apparatus according to claim 7,
further comprising
performing, by the control unit, a third processing of:
lowering the set values of the volume of the transmission signal and the volume of the reception signal by the adjustment requisite amount in the case where
the adjustment amounts of the frequency characteristics of the transmission signal and the frequency characteristics of the reception signal exceed an adjustable range,
when the set values of the frequency characteristics of the transmission signal and the frequency characteristics of the reception signal are lowered by the adjustment requisite amount,
while taking into account the lowered amount of the set values of the volume of the sidetone signal.

9. The method of controlling the telephone apparatus according to claim 8,
wherein
performing, by the control unit,
the first processing, the second processing, and the third processing in this order
when a signal indicating that a volume of the reception signal is to be raised is input while talking.

10. The method of controlling the telephone apparatus according to claim 9,
wherein
when a signal indicating that the volume of the reception signal is to be lowered is input while talking after the first processing, the second processing, and the third processing are performed in this order,
by the control unit,
restoring the set values of the frequency characteristics of the transmission signal and the frequency characteristics of the reception signal to prescribed initial values
after restoring the set values of the volume of the transmission signal and the volume of the reception signal to prescribed initial values, and then
restoring the set value of the volume of the sidetone to a prescribed initial value.

11. A non-transitory computer readable medium storing a program for a causing
a control unit of a telephone apparatus to perform a first processing of:
estimating a line echo amount based on
a volume of a DTMF signal generated based on a telephone number and
a volume of the DTMF signal input from a line;
calculating a howling noise threshold value based on
a maximum value of an acoustic echo generated at a handset and
set values of a volume of a sidetone signal, a volume of a transmission signal, and a volume of a reception signal; and
calculating a difference between the line echo amount and the howling noise threshold value as an adjustment requisite amount and
lowering the set value of the volume of the sidetone signal by the adjustment requisite amount
when the line echo amount is larger than the howling noise threshold value.

12. The non-transitory computer readable medium storing the program according to claim 11 for causing
the control unit to perform a second processing of:
calculating the howling noise threshold value based on
the maximum value of the acoustic echo,
the set values of the volume of the sidetone signal, the volume of the transmission signal, and the volume of the reception signal, and
the set values of the frequency characteristics of the transmission signal and the frequency characteristics of the reception signal; and
setting the set value of the volume of the sidetone signal to a minimum value and
lowering the set values of the frequency characteristics of the transmission signal and the frequency characteristics of the reception signal by the adjustment requisite amount,
while taking into account the lowered amount of the set value of the volume of the sidetone signal,
in the case where the set value of the volume of the sidetone signal becomes smaller than a prescribed minimum value
when the set value of the volume of the sidetone signal is lowered by the adjustment requisite amount.

13. The non-transitory computer readable medium storing the program according to claim 12 for causing
the control unit to perform a third processing of
lowering the set values of the volume of the transmission signal and the volume of the reception signal by the adjustment requisite amount
in the case where
the adjustment amounts of the frequency characteristics of the transmission signal and the frequency characteristics of the reception signal exceed an adjustable range,
when the set values of the frequency characteristics of the transmission signal and the frequency characteristics of the reception signal are lowered by the adjustment requisite amount,
while taking into account the lowered amount of the set value of the volume of the sidetone signal.

14. The non-transitory computer readable medium storing the program according to claim 13 for causing
the control unit to perform
the first processing, the second processing, and the third processing in this order
when a signal indicating that a volume of the reception signal is to be raised is input while talking.

15. The non-transitory computer readable medium storing the program according to claim 14 for causing,
when a signal indicating that the volume of the reception signal is to be lowered is input while talking
after the first processing, the second processing, and the third processing are performed in this order,
the control unit to
restore the set values of the frequency characteristics of the transmission signal and the frequency characteristics of the reception signal to prescribed initial values after restoring the set values of the volume of the transmission signal and the volume of the reception signal to prescribed initial values, and then
restore the set value of the volume of the sidetone signal a prescribed initial value.

\* \* \* \* \*